Nov. 13, 1923.

C. T. SMALL

1,474,176

CAN SEALING MACHINE

Filed Oct. 17, 1918    11 Sheets-Sheet 1

C. T. SMALL 1,474,176

CAN SEALING MACHINE

Filed Oct. 17, 1918     11 Sheets-Sheet 5

WITNESSES:
W. H. Alexander

INVENTOR.
C. T. Small.
BY
E. E. Huffman
ATTORNEY.

Nov. 13, 1923.  1,474,176

C. T. SMALL

CAN SEALING MACHINE

Filed Oct. 17, 1918   11 Sheets-Sheet 6

Nov. 13, 1923.

C. T. SMALL 1,474,176

CAN SEALING MACHINE

Filed Oct. 17, 1918   11 Sheets-Sheet 8

WITNESS
W. F. Alexander

INVENTOR.
C. T. Small.
BY
L. E. Huffman
ATTORNEY.

Nov. 13, 1923.

C. T. SMALL 1,474,176

CAN SEALING MACHINE

Filed Oct. 17, 1918    11 Sheets-Sheet 9

WITNESS
W. H. Alexander.

INVENTOR.
C. T. Small.
BY E. E. Huffman
ATTORNEY.

Nov. 13, 1923.  1,474,176
C. T. SMALL
CAN SEALING MACHINE
Filed Oct. 17, 1918   11 Sheets-Sheet 10

WITNESS
W. H. Alexander

INVENTOR.
C. T. Small.
BY
E. E. Huffman
ATTORNEY.

Patented Nov. 13, 1923.

1,474,176

UNITED STATES PATENT OFFICE.

CHESLEY T. SMALL, OF ST. LOUIS, MISSOURI, ASSIGNOR TO FIRST NATIONAL BANK IN ST. LOUIS, OF ST. LOUIS, MISSOURI.

CAN-SEALING MACHINE.

Application filed October 17, 1918. Serial No. 258,587.

*To all whom it may concern:*

Be it known that CHESLEY T. SMALL, a citizen of the United States of America, residing at 6761 Vernon Avenue, St. Louis, Missouri, United States of America, has invented a certain new and useful Can-Sealing Machine, of which the following is such a full, clear, and exact description, as will enable any one skilled in the art to which it appertains to make and use the same, reference being had to the accompanying drawings, forming part of this specification.

My invention relates to a sealing machine for sealing the tops or bottoms of metal cans. One object of my invention is to provide a sealing machine in which the cans will be carried through the machine in a continuous movement, thus obviating the stoppage of the can carrying portion of the machine during the sealing operation. By this arrangement, I not only increase the speed of the machine, but also obviate the wear and tear on the machine necessary in the starting and stopping of the can carrying part which necessarily takes place in those machines in which the can is stationary, except for its rotary movement when the top or bottom is secured in place by the sealing mechanism.

My invention consists in various other novel features and details of construction, all of which are described in the following specification and pointed out in the claims annexed hereto.

In the accompanying drawings which illustrate one form of can sealing machines made in accordance with my invention.

Frame of the machine.

Figure 4:
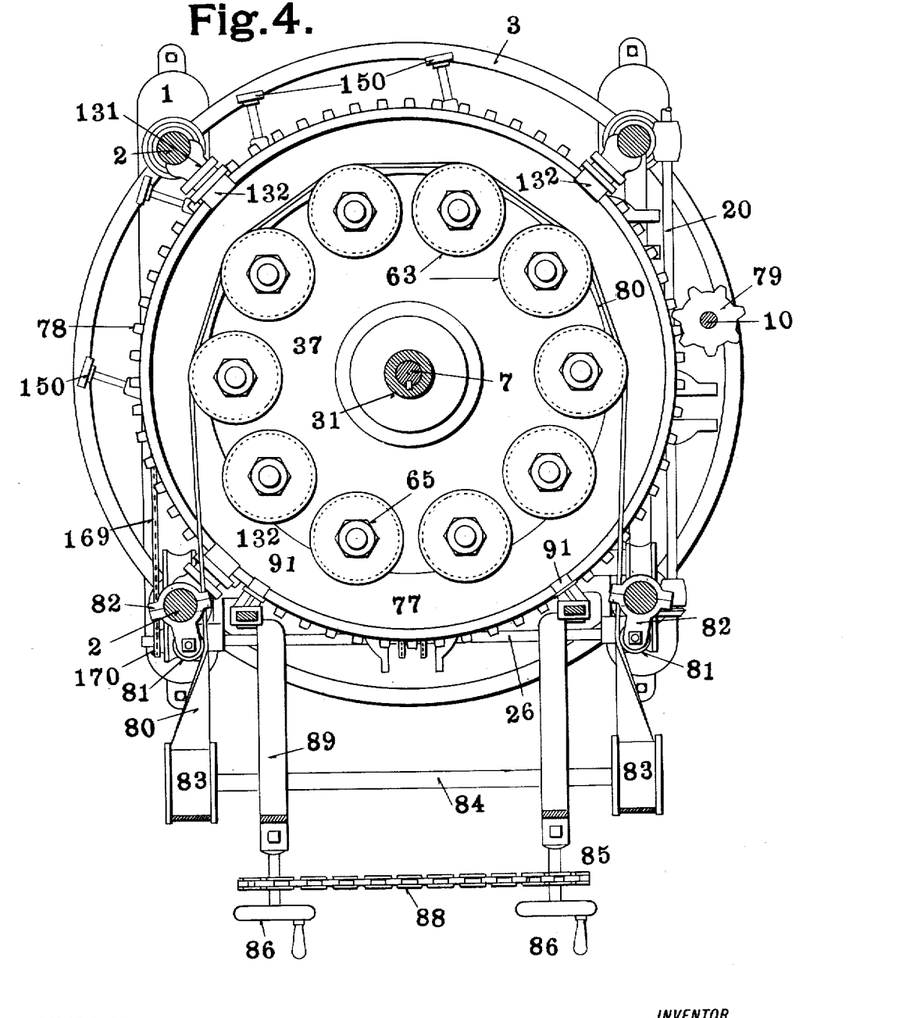
Fig. 4 is a horizontal section.
Figure 5:
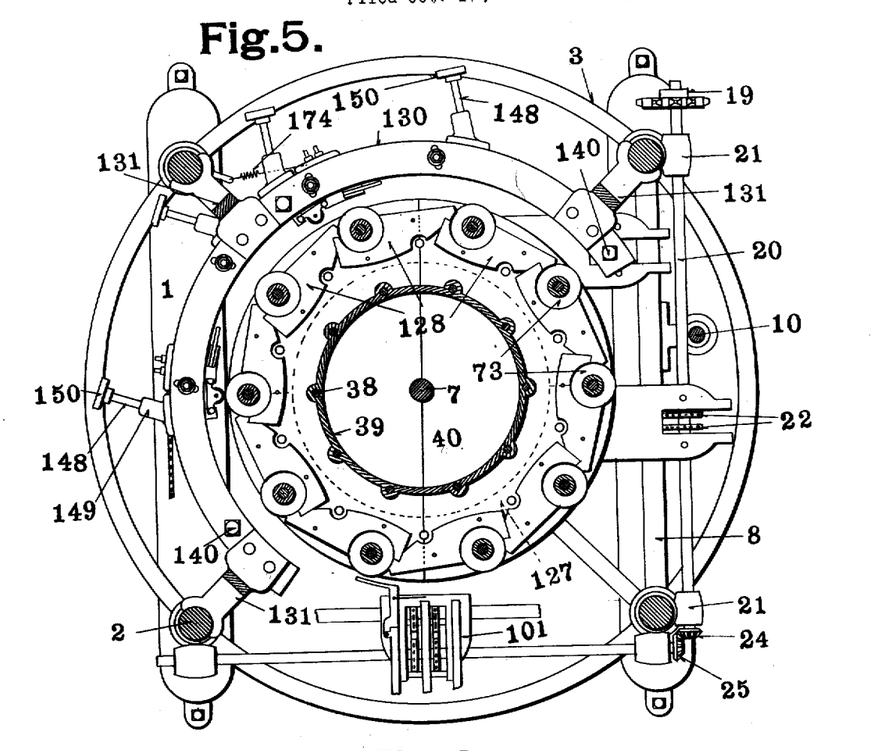
Fig. 5 is a horizontal section.
Figure 6:
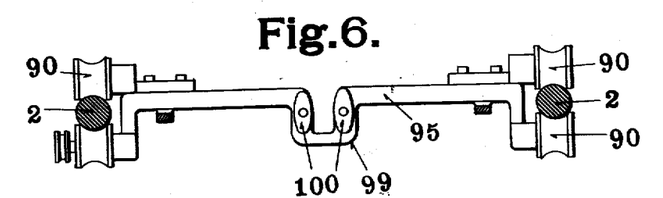
Fig. 6 is a top plan view showing a portion of the cover conveying support.
Figure 7:
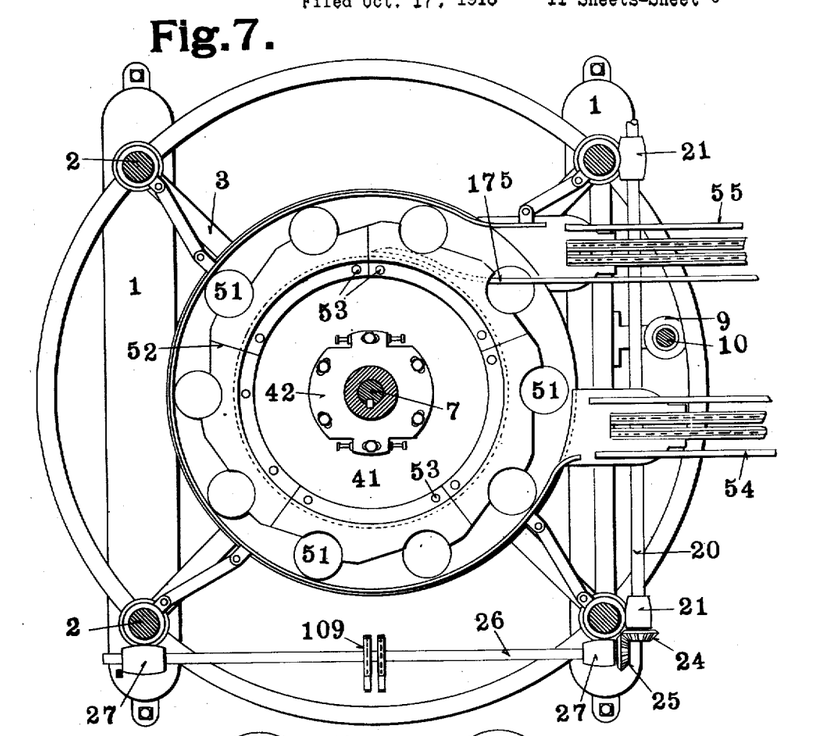
Fig. 7 is a horizontal section.

The frame of the machine in general resembles that shown in my application for patent on filling machine, Serial No. 184,990, filed August 8, 1917 and will now be described. 1 indicates base pieces in which are secured four uprights 2 which are arranged in quadrangular position as best shown in Figs. 4, 5, and 7 of the drawings. The upper ends of the uprights 2 are spaced apart by means of a lower spider 3 and the upper spider 4. The hub 5 of the lower spider 3 and the hub 6 of the upper spider 4 form supporting bearings for the central shaft 7 of the machine as will be hereinafter more fully set forth. Carried by the two front uprights 2 is a cross bar 8 carrying a bearing 9 in which is journaled the lower end of the shaft 10. The upper end of which is journaled in the bearing 11, carried by the yoke 12, the arms of which are provided with bearings 13, (Fig. 1) surrounding the driving shaft 14. Motion is communicated from the driving shaft 14 to the shaft 10 through bevel gears 14ª and 10ª. This driving shaft 14 is supported in bearings 15 carried on the two front uprights 2 and is provided at one end with a pulley 16 (Fig. 1) from which the machine is driven. The opposite end of the shaft 14 is provided with a sprocket wheel 17 around which passes a sprocket chain 18 which also passes around the sprocket wheel 19 upon a shaft 20. This shaft 20 is supported in bearings 21 carried by the front uprights 2 provided with sprocket wheels 22 for driving the can conveyors which are similar in construction to those shown in my application on filling machine above referred to. The said can conveying apparatus is supported from the cross bar 23 carried by the front uprights 2. The shaft 20 has secured to it at the end opposite the sprocket wheel 19 a bevel gear wheel 24 meshing with the bevel gear wheel 25 on a shaft 26 supported in bearings 27 carried by the two side uprights 2. The cover chute is driven from this shaft 26 as will be hereinafter fully described.

Can carrying mechanism.

Figure 3:
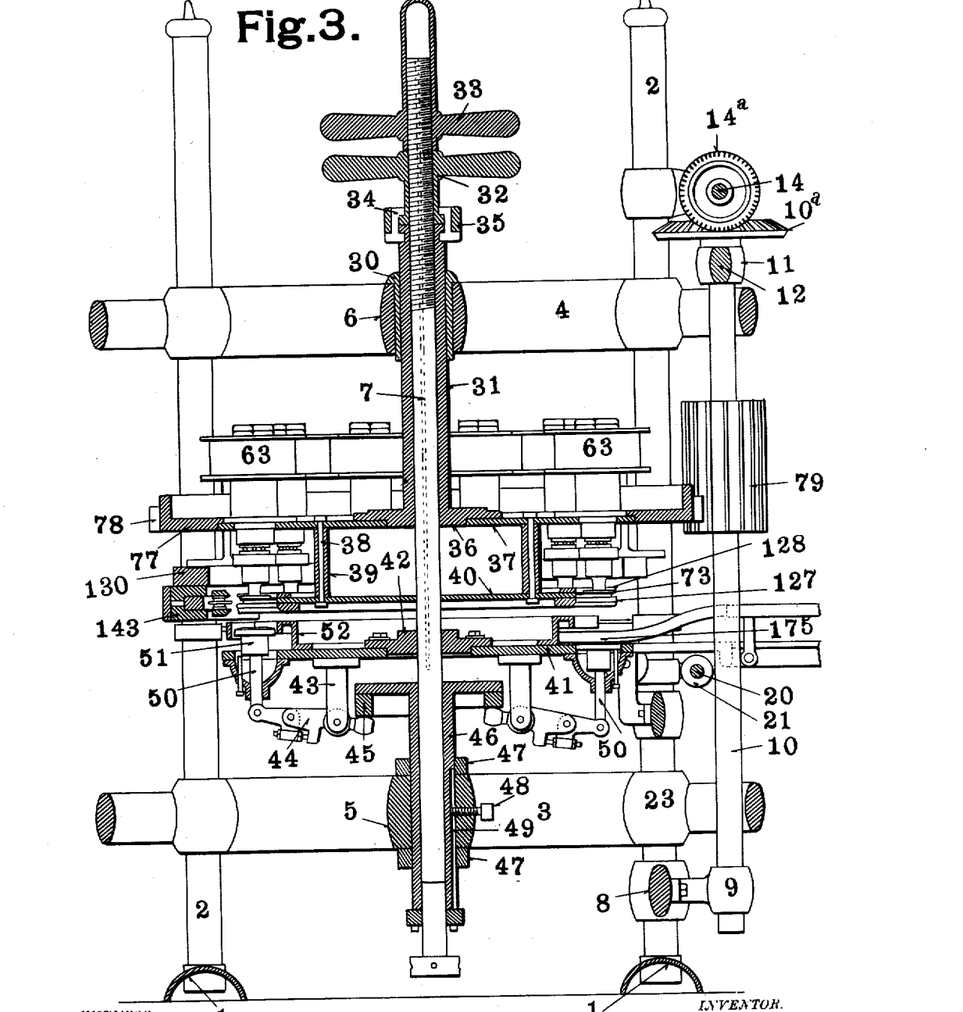
Fig. 3 is a vertical cross section.

Secured in the hub 6 of the upper spider 4 is a bushing 30 forming a bearing for a sleeve 31 surrounding the upright shaft 7 of the machine, threaded to the upper end of the shaft 7 is an adjusting nut 32 and above this a lock nut 33, the adjusting nut 32 being rotatably connected to the sleeve 31 by the split collar 34 and locking collar 35, all of which parts are like those described in my application above referred to. Carried on the lower end of the sleeve 31 is a disc 36 to which is secured an annular part 37 for supporting the can rotating spindles. Secured to this plate 37 by means of bolts 38 is a collar 39 carrying a disc 40. Arranged below the disc 40 is a disc 41 which is adjustably secured to the central shaft by means of a flange 42 as shown in detail in Fig. 7. This adjusting flange, however, is like that shown in my application above referred to and will not be here described in detail. Carried by the disc 41 are pedestals 43 carrying operating levers 44 actuated from the track 45 carried on the sleeve 46 adjustably mounted in the hub 5 of the spider 3 by means of nuts 47 and prevented from rotating by a set screw 48 engaging with a key way 49 in the sleeve 46. All of said parts being similar to my prior application above referred to. In the present machine, however, the can lifting rods 50 are provided at their upper ends with rotating can supports 51 in place of the fixed can supports of my prior application. As the can supports 51 of the machine are rotary it is necessary to provide the disc 41 with can guides 52 shown in section in Fig. 3 of the drawings and in plan view of Fig. 7. The can guide 52 is preferably formed in five parts and secured to the disc 41 by bolts or rivets 53 (Fig. 7). The cans are carried to and from the machine by conveyors 54 and 55 respectively which are similar to the conveyors in my filling machine above referred to except that the outgoing conveyor 55 has its inner guide rail extended to form an extracting arm 175 as best shown in Figs. 3 and 7.

Can rotating mechanism.

Figures 19, 20, 21:
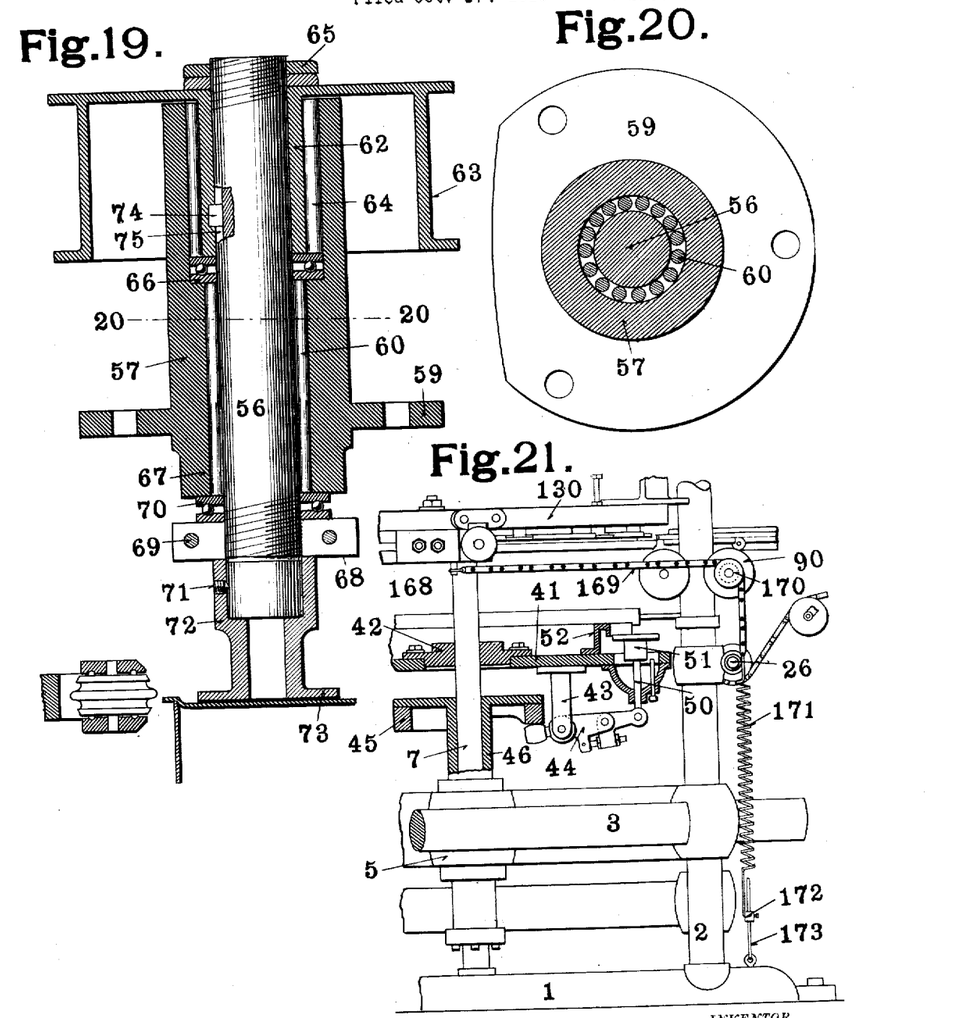
Fig. 19 is an enlarged sectional view of one of the sealing spindles.
Fig. 20 is a section taken on the line 20—20 of Fig. 19.
Fig. 21 is a rear elevation partly in section of a portion of the machine.

Carried by the plate 37 are can rotating spindles preferably ten in number, as best shown in Fig. 4. As shown in detail in Fig. 19 each of these spindles consists of a rod 56 journaled in the sleeve 57 secured to the plate 37 by bolts or rivets 58 passing through a flange 59. Arranged between the rod 56 and the sleeve 57 are a number of rolls 60 forming a bearing. The sleeve 57 is enlarged at its upper end to receive a sleeve 62 carried by a pulley 63. Between the sleeve 62 and the sleeve 57 are a second set of rolls 64 forming a bearing between the pulley and the sleeve. The upper end of the rod 56 is provided with lock nuts 65. Between the lower end of the sleeve 62 and the offset in the sleeve 57 is an upper thrust bearing 66. Projecting through the disc 37 is a hub 67 and below this hub a split collar 68 threaded on the lower end of the rod 56 and adapted to be secured in position after adjustment by bolt 69. Arranged between this collar 68 and the hub 67 is a second thrust bearing 70. Below the collar 68 the rod 56 has secured to it by a set screw 71 a sleeve 72 carrying at its lower end a disc 73 adapted to bear on the upper end of the can and rotate the same while it is acted on by the sealing roll as will be hereinafter described. The vertical position of the disc 73 may be adjusted by the joint movement of the lock nuts 65 and the split collar 68. The pulley 63 is prevented from rotating relatively to the spindle 56 by a key 74 engaging with a key seat 75 of sufficient length to allow the necessary vertical adjustment.

Figures 9, 10, 11, 12, 13:
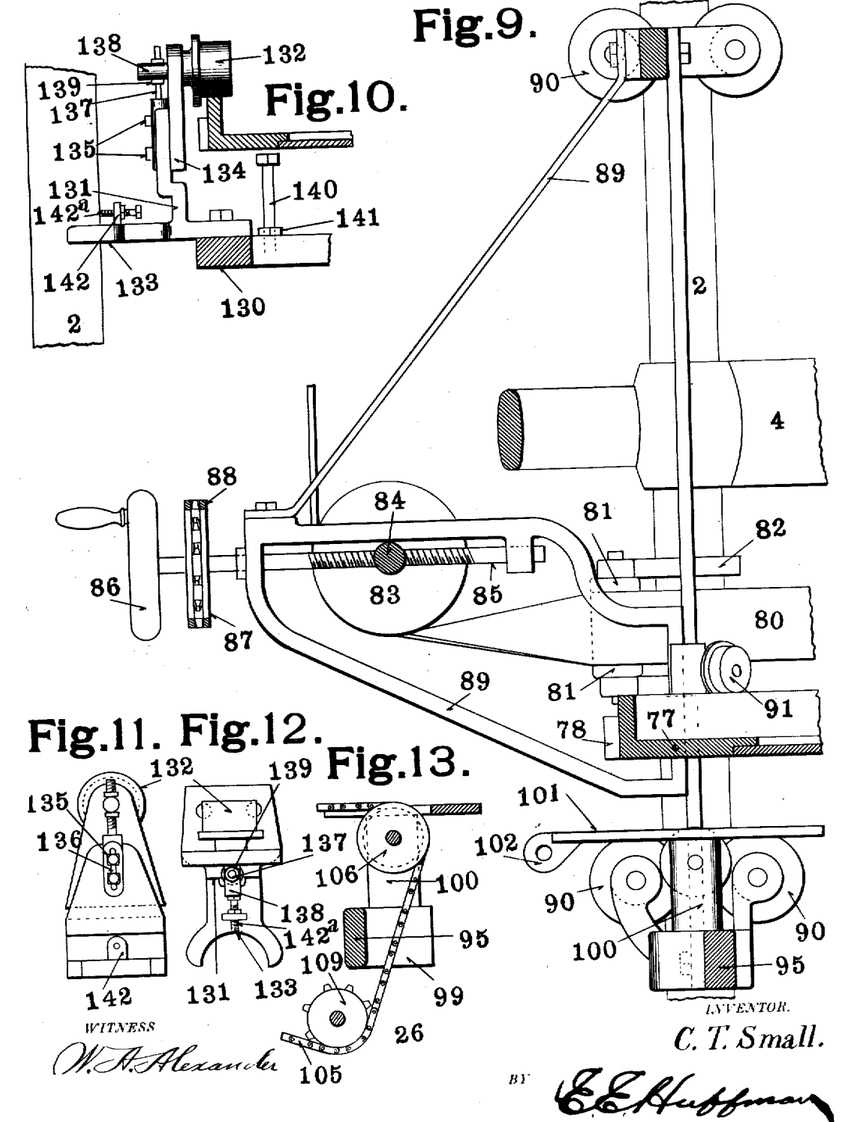
Fig. 9 is an enlarged sectional view showing the cover conveyor frame.
Figs. 10, 11 and 12 are detailed views showing a modified form of suspension shown in Fig. 5.
Fig. 13 is a detailed view showing the driving mechanism for the cover chute.
Figure 14:
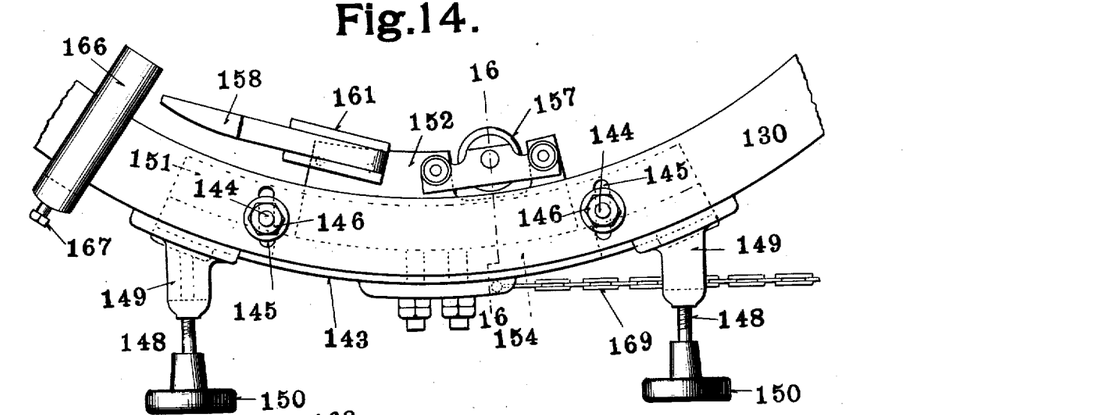
Fig. 14 is an enlarged top plan view of a portion of the sealing mechanism.
Figure 15:
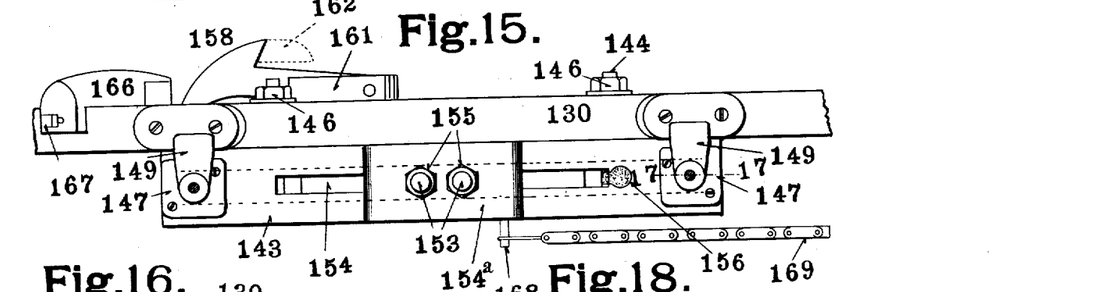
Fig. 15 is a front view of the parts shown in Fig. 14.
Figures 16, 17, 18:
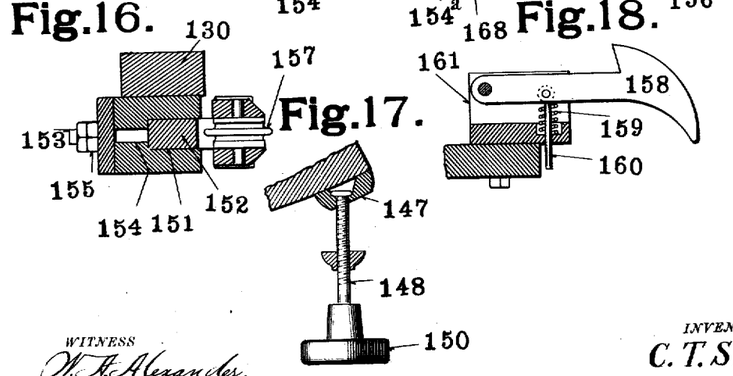
Fig. 16 is a section taken on the line 16—16 of Fig. 14.
Fig. 17 is a section taken on the line 17—17 of Fig. 15.
Fig. 18 is a detailed view of the latch for the sealing shuttle.

In order to rotate the spindles 56 around the central shaft 7, I secure to the disc 37 an annular member 77 provided on its periphery with teeth 78 adapted to engage with the elongated pinion 79 secured to the shaft 10 herein before referred to. By the use of the elongated pinion 79 the spindle carrying disc together with its attached parts may be adjusted vertically to adapt the machine to cans of different height without moving the teeth 78 out of engagement with the teeth of the pinion 79. In order that the spindles 56 may be rotated on their axes at the same time that they are rotated around the central shaft 7, I provide a belt 80 as best shown in Figures 4 and 9 which belt passes around the pulleys 63 as best shown in Figure 4. It will be observed that by the arrangement of the belt about one half of the pulleys will be engaged by the belt and the corresponding spindles will be rotated. In order to guide the belt 80 to the pulleys 63, I provide a pair of guiding rolls 81 which are adjustably secured by brackets 82 to two of the uprights 2. The belt 80 after passing to and from the guiding rolls 81 passes around vertical pulleys 83 and then around a suitable driving pulley not shown. In order that the belt 80 may be loosened or tightened to compensate for the raising and lowering of the spindle plate, I mount the shaft 84 upon which the pulleys 83 are carried upon a pair of threaded rods 85 provided with hand wheels 86. Each of the rods 85 are also provided with a sprocket wheel 87 around which wheels passes a sprocket chain 88 so as to cause the two adjusting rods 85 to move simultaneously and thus preserve the parallel position of the shaft 84 as it is adjusted towards and away from the machine. The shafts 85 are carried in a frame 89 provided with wheels 90 engaging with the uprights 2. The frame 89 is supported from the annular member 77 by means of wheels 91 carried by said frame.

*Cover feed.*

Figure 2:
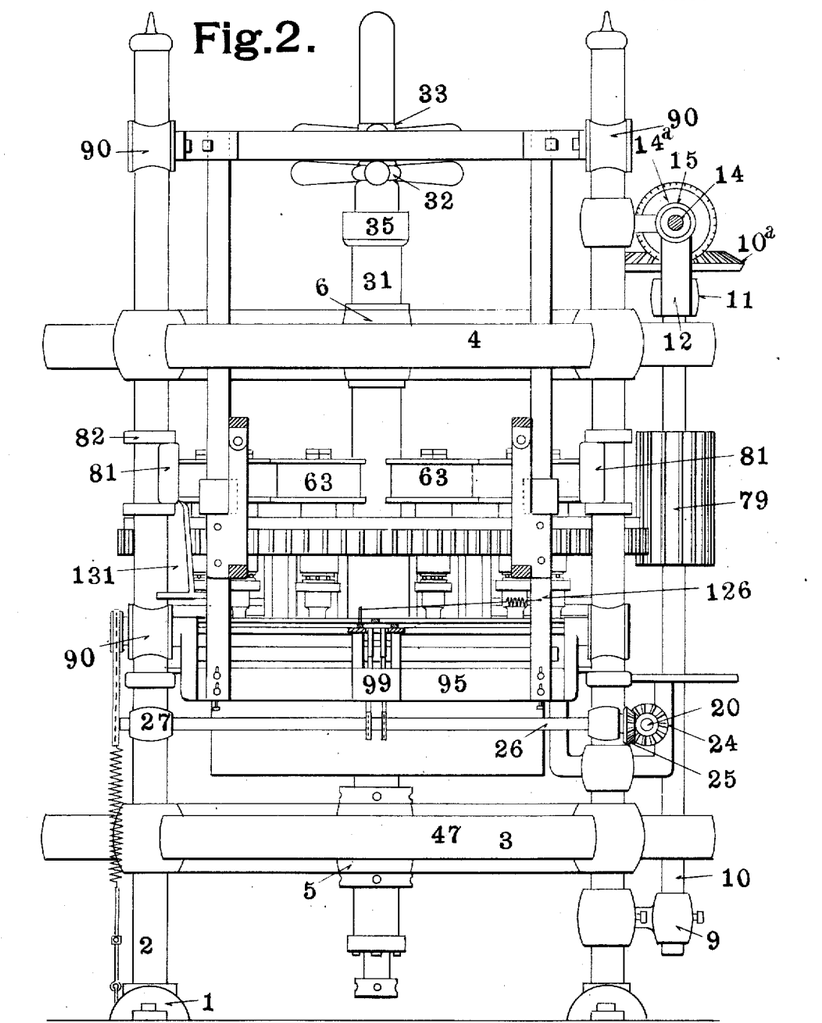
Fig. 2 is a side elevation. The cover chute and the frame carrying same being shown in section.
Figure 8:
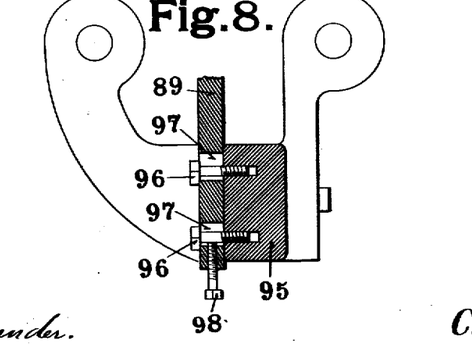
Fig. 8 is a detail view showing the adjusting means for the cover chute hanger.
Figure 25:
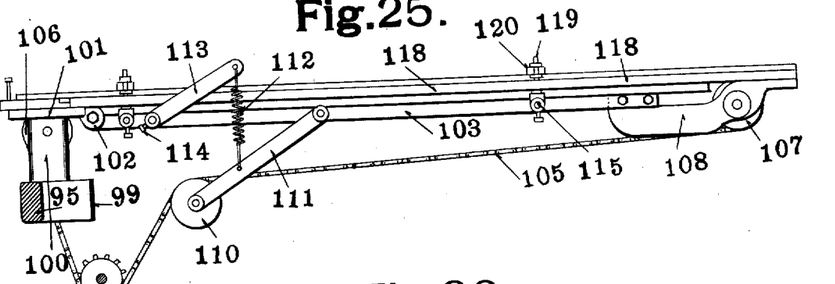
Fig. 25 is a side view of the cover chute.
Figure 26:
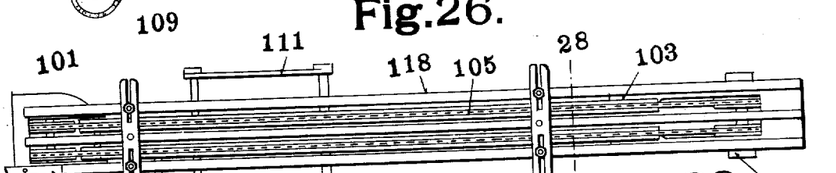
Fig. 26 is a top plan view of the cover chute.
Figure 27:
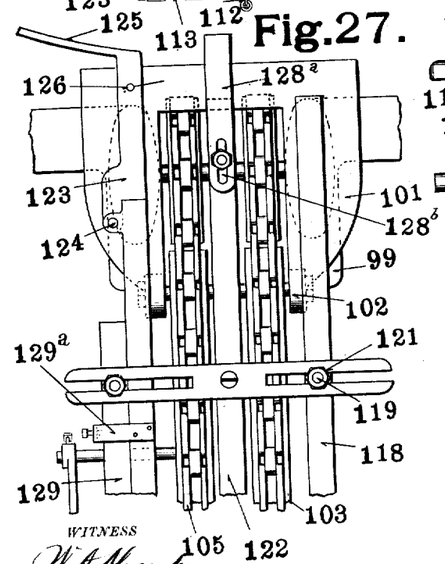
Fig. 27 is an enlarged top plan view of the inner end of the cover chute showing slight modifications and Fig. 28 is an enlarged sectional view taken on the line 28—28 of Fig. 26.
Figure 28:
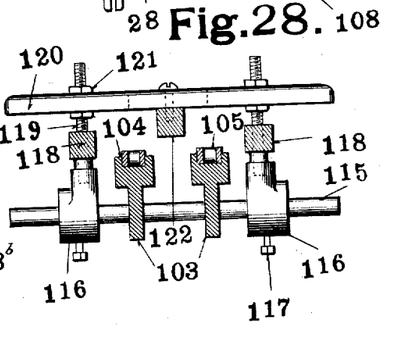

Carried by the lower end of the frame 89 is a crosss piece 95 for supporting the cover chute. This cross piece 95 also carries two pair of the wheels 90 above referred to and is secured to the lower end of the frame by a pair of bolts 96 (Fig. 8) passing through slots 97 as best shown in Fig. 8 of the drawings. In order to secure accurate adjustment of the cover chute in line with the cover receiving plate, I provide the frame 89 with set screws 98 each of which are adapted to bear against one of the bolts as clearly shown in this figure. The cross piece 95 is provided at its central part with a forwardly projecting U-shaped portion 99 carrying a pair of uprights 100 upon which is secured the landing plate 101 forming the inner end of the cover chute. Secured to the lugs 102 carried by the landing plate 101 (Fig. 25) are a pair of T-rails 103 having slots 104 formed in their upper faces and adapted to receive sprocket chains 105 forming a traveling portion of the conveyor. The sprocket chains 105 pass over pulleys 106 journaled in the uprights 100 at the upper end of the conveyor and also over pulleys 107 journaled in a bracket 108 forming the outer end of the conveyor. The sprocket chains are driven by sprocket wheels 109 carried upon the shaft 26 herein before referred to. In order to take up the slack of the chains 105 when the cover chute is raised and lowered, I provide a pair of idler wheels 110 carried upon arms 111 pivoted to the T-rails 103. Secured to one of the arms 111 is a spring 112 the opposite end of which is attached to an arm 113 which is adjustably secured to one of the T-rails 103 by means of set screw 114. Carried by the T-rails 103 are rods 115 upon which are adjustably mounted brackets 116 by means of set screws 117. These brackets 116 carry side rails 118 adapted to engage with the edges of the covers carried in the chute. These rails also carry upwardly projecting threaded rods 119 supporting cross pieces 120 the height of which may be varied by nuts 121. These cross pieces 120 carry a rail 122 adapted to engage with the upper faces of the covers. In order to provide means for allowing escape of one of the covers from the machine in case of the entrance of a defective cover into the machine I provide one of the side rails 118 with a member 123 pivoted at 124 to the said side rail and provided at its end with a laterally projecting part 125. A spring 126 (Fig. 2) is secured at one end to this member 123 and at the other to a frame 89 so as to normally hold the part in position as shown in Fig. 26 and Fig. 2 of the drawings. In case, however, defective covers or bottoms become jammed in the machine, the spring 126 will allow the member 123 to swing on its pivot towards the left and thus allow the escape of the covers. It will be evident by the adjustments just described, the cover chute may be changed to accommodate covers of different diameters and thicknesses. The cover chute is adapted to feed the covers between the lower faces of the discs 73 and a cover supporting ring 127 secured to the lower face disc 40 herein before referred to. The disc 40, as well as the ring 127, is preferably made in two parts as shown in Fig. 5 to allow the removal and insertion of said parts when changing the machine to operate on cans of different diameters. Secured to the upper face of the disc 40 are a number of guide plates 128 adapted to guide the covers into position. In Fig. 27 I have shown a slight modification to enable the cover chute to be adjusted longitudinally to accommodate cans of varying diameter. In this modification, the central rail 122 is provided with an extension 128$^a$ adjustably secured to said rail by a slotted connection 128$^b$. In this modification, the side rail 118 carrying the pivoted member 123 is not directly connected to the brackets 116, but to an auxiliary rail 129 carried by said brackets. The connection between the side rail 118 and the auxiliary rail 129 is made by a clamp 129$^a$ so that the rail 118 may be adjusted toward and away from the center of the machine to adapt the machine to cans of varying diameter.

*Seaming mechanism.*

After the covers are fed into position below the spindles 56 they are carried to the seaming mechanism by the rotation of the spindle carrying parts around the shaft 7. This seaming mechanism will now be described.

Figure 1:
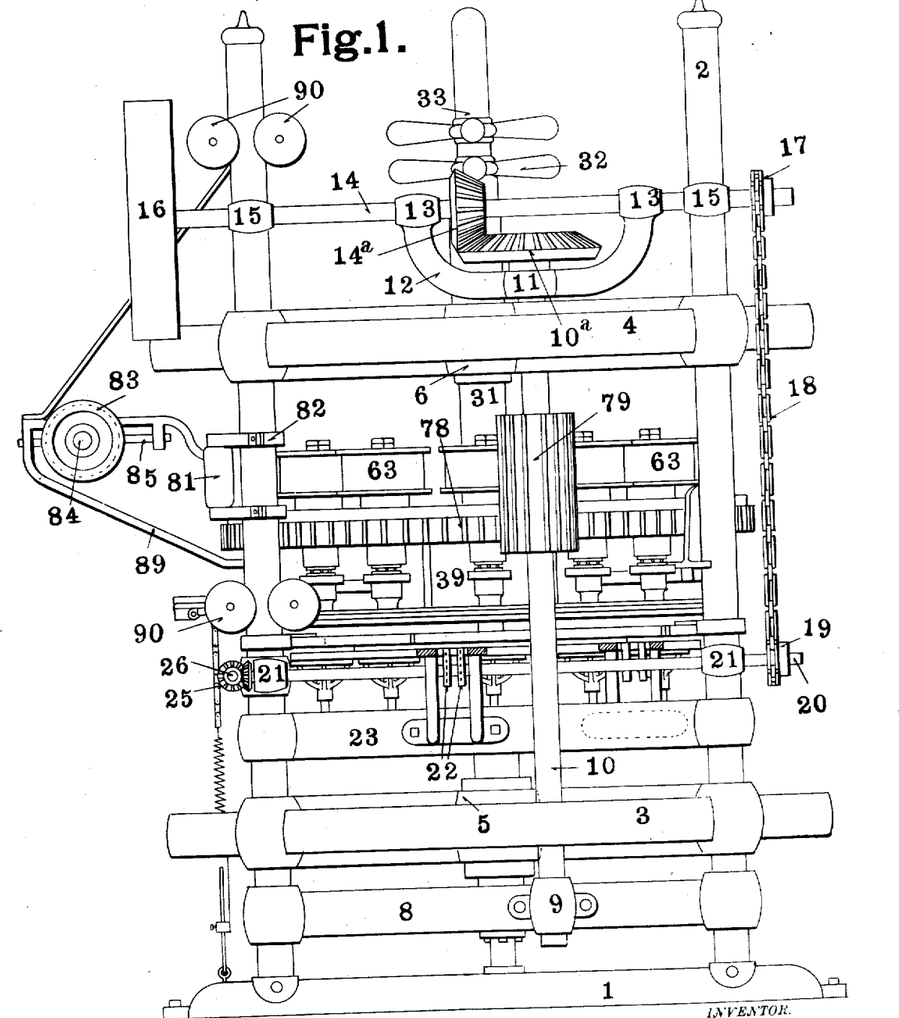
Fig. 1 is a front elevation.

A semiannular member 130 is supported by means of brackets 131 carrying rolls 132 from the annular member 77 hereinbefore referred to. The brackets 131 are provided with rearwardly projecting portions 133 engaging with the uprights 2. The rolls 132 engaging with the annular member 77 may be rigidly carried by the brackets 131 as shown in Figs. 1 and 2 of the drawings. I prefer, however, to make them adjustable as shown in Figs. 10, 11, and 12. In this construction, the bracket 131 is provided with an extension 134 secured to the body of the bracket by bolts 135 passing through a slot 136. In order to secure fine adjustment of the roll 132, the bracket 131 has secured to it a thread rod 137 passing through the shaft 138 carrying the roll 132 and provided at each side of said shaft with lock nuts 139. It will be evident that by loosening the bolts 135 the fine adjustment of the wheel 132 can be secured by moving the lock nuts 137 after which the bolts 135 can be tightened to rigidly secure the two parts of the brackets together. To prevent any lateral movement of the member 130, I provide each of the brackets 131 with a lug 142 carrying a set screw 142ª adapted to bear against the upright 2. The semiannular member 130 also carries bolts 140 terminating a slight distance below the disc 77 so as to prevent the accidental raising of the said semiannular member. After the distance of the bolts 140 from the underface of the annular member 77 is adjusted said bolts are locked in position by means of jam nuts 141.

Figure 22:
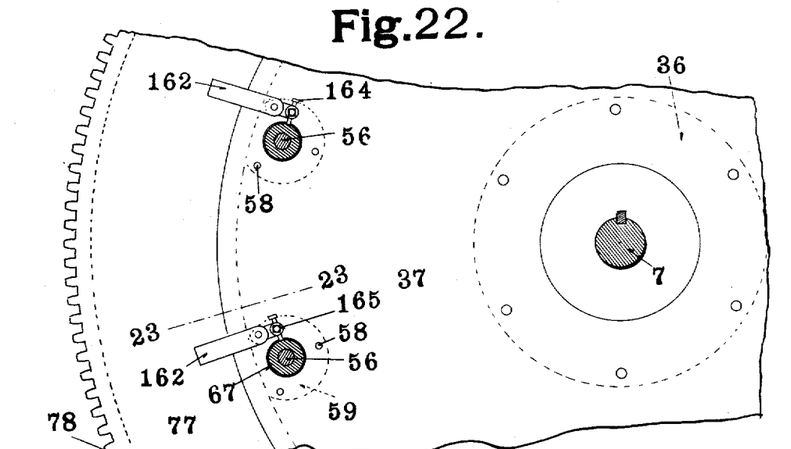
Fig. 22 is an enlarged bottom plan view of a portion of the spindle carrying plate.
Figure 23:
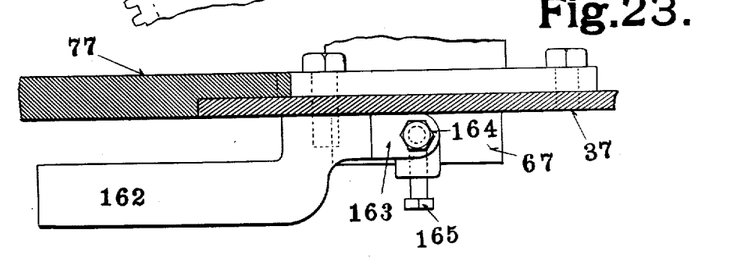
Fig. 23 is an enlarged section taken on the line 23—23 of Fig. 22.

Carried by the semiannular member 130 are one or more sectors 143 as best shown in Figures 5, 14 to 18 inclusive. Each of these sectors 143 is adapted to carry a seaming roll for operating upon the can cover. In the present machine, I have shown two such seaming rolls. Each of the sectors 143 is secured to the member 130 by means of a pair of bolts 144 passing through slots 145 formed in said member. The bolts 144 are provided with nuts 146 by means of which the parts may be firmly locked in position after adjustment. In order to adjust the sector 143, I secure to it at each end by means of a block 147, a threaded rod 148 passing through a bracket 149 carried on the member 130 and provided with a hand wheel 150. It will be evident that by loosening the nuts 146, and by moving the hand wheels 150 either singly or in unison, the sector 143 may be adjusted bodily toward or away from the center of the machine or one end can be moved in advance of the other so as to secure a general increase of pressure on the roll as it is moved forward as will be hereinafter described. Sliding in a slot 151 formed in the member 143 is the roll carrying block or shuttle 152. Projecting from the roll carrying block 152 are a pair of threaded rods 153 which project through an extension 154 of the slot 151 and engaging with a guide plate 154ª which is secured in place by nuts 155 on the said rods 153. Formed at one end of the slot 154 is a stop 156 of rubber or other yielding material against which one of the rods 153 is adapted to strike when the seaming roll block is returned to its normal position. Secured in each of the blocks 152 is a seaming roll 157. In order to move the seaming rolls 157 in the direction of rotation of the plate 40 each of the seaming roll blocks 152 has pivoted to it a latch 158 which is normally held in raised position by a spring 159 placed around a rod 160 secured to said latch and extending through an opening in the bottom of the bracket 161 carrying said latch 158. The latch 158 is adapted to engage with a finger 162 secured to the lower face of the plate 37 as best shown in Figs. 22 and 23. Each of the fingers 162 which are ten in number to correspond with the number of spindles 56 is secured in position by one of the bolts 58 herein before referred to. A provision is made for adjusting the position of fingers 162 by providing the rearwardly projecting portion 163 of said finger with an adjusting bolt 164 adapted to bear against the lower end 67 of the sleeve surrounding said spindle. In order to secure the adjusting bolt in position after the proper adjusting has been secured, I provide a set screw 165 adapted to bear against said adjusting bolt.

After the seaming roll 157 has been carried forward the proper distance, the finger 162 is disengaged from the latch 158 by the engagement of the forward curved end of said latch with a releasing member 166 secured to the member 130 by a set screw 167. It will be evident that by moving the releasing member 166 along the member 130, the point at which the seaming roll is released may be varied. In order to return the seaming roll to its normal position, I provide the block 154 with the downwardly projecting pin 168 to which is secured one end of a sprocket chain 169. This sprocket chain 169 passes over a pulley 170 carried by one of the guide wheels 90 hereinbefore referred to and secured to a coil spring 171 the opposite end of which is secured by means of a block 172 to a rod 173 secured to one of the base pieces 1. It will be evident that by adjusting the block 172 on the rod 173 the tension of the spring 171 may be varied and consequently the return movement of the seaming roll regulated. The second seaming roll is a duplicate of the one just described except that to return it to normal position, I may provide a coil spring 174 extending directly from the block 154 to one of the uprights 2 as shown in Fig. 5 of the drawings.

*Operation.*

Figure 24:
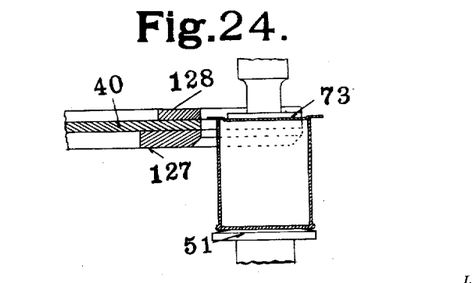
Fig. 24 is an enlarged sectional view showing the manner of applying the cover to the can.

The operation of the machine briefly is as follows: The cans are carried into the machine on the can chute 54 by which they are delivered on to the can supports 51 which are continuously rotated. After the can has been moved forward a slight distance in a clockwise direction the can support 51 is raised by the action of its lever 44 so as to move the can into contact with the cover as best shown in Fig. 24. As soon as the can is carried forward a sufficient distance to bring the pulley 63 of its spindle into contact with the belt 80, the can is rapidly rotated. As it moves forward the corresponding finger 162 engages with the latch 158 and moves the seaming roll forward together with the can. At the same time, the seaming roll is moved inwardly to a greater or less extent depending upon the adjustment of the two hand wheels 150. The action of the seaming roll 157 on the rapidly rotating can turns over the edge of the cover thus forming a tight joint. In some forms of joint one seaming roll will be sufficient. I have, however, shown a second seaming roll which may be used when desired. Its action and mode of operation is similar to that of the first seaming roll, when that seaming roll has reached the end of its travel the curved forward end of the latch 158 comes in contact with the releasing member 166 which releases it from the finger 162 and allows it to be returned to normal position by the action of the spring 171 so that it is in position to operate on the next succeeding can. After the cans have been sealed they are discharged on to the conveyor 55 by the discharge arm 175 thus completing the operation of the machine.

Having fully described my invention, what I claim as new and desire to secure by Letters Patent of the United States is:

1. In a can sealing machine, the combination with a continuously movable member adapted to carry cans, of means for rotating the cans, and a member reciprocating in the direction of travel of the cans and carrying a seaming roll for operating on said cans.

2. In a can sealing machine, the combination with a continuously rotating member adapted to carry cans, of means for rotating the cans, and a member reciprocating in the direction of travel of the cans carrying a seaming roll for operation on said cans.

3. In a can sealing machine, the combination with a continuously rotating member adapted to carry cans, of means for rotating said cans, a part carrying a seaming roll reciprocating in the direction of travel of the cans, means for moving said reciprocating part with the member during the operation on the can, and means for returning said part to normal position.

4. In a can sealing machine, the combination with a continuously rotating member adapted to carry cans, of means for rotating the cans, a part carrying a seaming roll reciprocating in the direction of travel of the cans, means for moving said reciprocating part with the member during the operation on the can, and spring actuated means for returning said part to normal position.

5. In a can sealing machine, the combination with a rotary member adapted to carry cans, of means for rotating said cans, a normally stationary roll support carried by said member, and a seaming roll carried by said support and reciprocating in the direction of travel of the cans.

6. In a can sealing machine, the combination with a rotary member adapted to carry cans, of means for rotating said cans, a normally stationary roll support carried by said member, means for adjusting said roll support in the direction of the length of the cans, and a seaming roll carried by said support and reciprocating in the direction of travel of the cans.

7. In a can sealing machine, the combination with a rotary member adapted to carry cans, means for rotating said cans, a normally stationary roll support carried by said member, means for adjusting said support toward and away from the cans, and a seaming roll carried by said support and reciprocating in the direction of travel of the cans.

8. In a can sealing machine, the combination with a rotary member adapted to carry cans, of means for rotating said cans, a normally stationary roll support carried by said member, means for independently adjusting each end of said support toward and away from the can, and a reciprocating seaming roll carried by said support.

9. In a can sealing machine, the combination with a rotary member adapted to carry cans, means for rotating said can, a normally stationary arcuate roll support carried by said member, and a reciprocating seaming roll carried on and guided by said support.

10. In a can sealing machine, the combination with a rotary member adapted to carry cans, of means for rotating said cans, a normally stationary sector supported from said member, a reciprocating roll support adjustably carried by said sector, means carried by said member for engaging and moving said roll in the direction of the travel of the member, and means for releasing said roll.

11. In a can sealing machine, the combination with a rotary member adapted to carry cans, of means for rotating said cans, a normally stationary section supported from said member, a reciprocating roll support carried by said sector, means carried by said member for engaging and moving said roll in the direction of the travel of said member, and adjustable means for releasing said roll.

12. In a can sealing machine, the combination with a rotary can holding member, of can chucks co-operating therewith, means for adjusting said chucks vertically for different heights of cans, a plurality of rotary spindles carried by said chucks and movable therewith, a flexible driving member for rotating said spindles, and slack adjusting means for said flexible driving member.

13. In a can sealing machine, the combination with a continuously rotating member adapted to carry cans, of a plurality of rotary spindles carried thereby and movable therewith, means for rotating said spindles, and a seaming roll reciprocating in the direction of travel of said cans and traveling with said member during its operation on the cans.

14. In a can sealing machine, the combination with a continuously rotating member adapted to carry cans, of a plurality of rotary spindles carried thereby and movable therewith, means for rotating said spindles, and a part reciprocating in the direction of travel of said cans and carrying a seaming roll.

15. In a can sealing machine, the combination with a continuously rotating member adapted to carry cans, of a plurality of rotary spindles carried thereby and movable therewith, a reciprocating part carrying a seaming roll, means for moving said reciprocating part with the rotating member during the operation on the cans, and means for returning said part to normal position.

16. In a can sealing machine, the combination with a continuously rotating member adapted to carry cans, of a plurality of rotary spindles carried thereby and movable therewith, a flexible driving member for rotating said spindles, and a part reciprocating in the direction of travel of said cans and carrying a seaming roll traveling with said member during its operation on the cans.

17. In a can sealing machine, the combination with a continuously rotating member adapted to carry cans, of a plurality of spindles carried thereby and movable therewith, pulleys on said spindles, and a part reciprocating in the direction of travel of the cans and carrying a seaming roll traveling with said member during its operation on the cans.

18. In a can sealing machine, the combination with a continuously rotating member adapted to carry cans, of a plurality of spindles carried thereby and movable therewith, vertical pulleys on said spindles, a cover chute frame supported from said rotary member, and a pair of horizontal pulleys adjustably mounted on said frame for guiding the belt to said first named pulleys.

19. In a can sealing machine, the combination with a continuously rotating member adapted to carry cans, of means for adjusting said member vertically, a plurality of spindles carried thereby and movable therewith, vertical pulleys on said spindles, a frame supported from said rotating member and vertically adjustable therewith, a pair of horizontal pulleys mounted on said member for guiding the belt to said first named pulleys, and means for adjusting said horizontal pulleys laterally.

20. In a can sealing machine, the combination with a continuously rotating member adapted to carry cans, of a plurality of can rotating spindles carried thereby and movable therewith, a sleeve mounted on said member and through which said spindles project, roller bearings arranged between said sleeve and spindles, adjustable end-thrust bearings on said spindles, and pulleys mounted on said spindles, whereby they are rotated.

21. In a can sealing machine, the combination with a continuously rotating member adapted to carry cans, of means for rotating said cans, a normally stationary sector supported from said member, a reciprocating roll support carried by said sector, adjustable means for moving said reciprocating support in the direction of travel of said member, and means for releasing said roll support.

22. In a can sealing machine, the combination with a continuously rotating member adapted to carry cans, of means for rotating said cans, a normally stationary sector supported from said member, a seaming roll carried by said sector, adjustable means carried by said member for engaging the roll to move it in the direction of travel of said member, and adjustable means for releasing said roll.

23. In a can sealing machine, the combination with a continuously rotating member adapted to carry cans, of a spindle supporting disc forming a part of said member, spindles carried by said disc, means for rotating said spindles, a reciprocating roll support carried by said member, and means carried by said disc for engaging and moving the roll support in the direction of travel of said disc, and means for releasing said roll support.

24. In a can sealing machine, the combination with a continuously rotating member adapted to carry cans, of a spindle supporting disc forming part of said member, a reciprocating roll carried by said member, means adjustably carried by said disc for engaging and moving the roll in the direction of travel of said can carrying member, and means for releasing said roll.

25. In a cover conveyor for can machines, the combination with a pair of laterally adjustable side rails, of a central rail, a discharge member pivotally connected to one of said side rails, and means for adjusting said latter named side rail longitudinally.

26. In a can seaming machine, the combination of a rotary carrier, can supporting members rotatably mounted on said carrier, a can seaming device adapted to move with said carrier through a part of the rotation of said carrier and to be pressed into operative relation to said cans for seaming the same, and means for returning said seaming device to its initial position to move the same into engagement with the next can.

27. In a container closing machine, the combination of a continuously moving carrier for containers, a single set of closing devices each of which is adapted to perform a different part of the closing operation and which operate substantially simultaneously on different containers, and means for moving said closing devices into operative relation to different containers while the containers are moving continuously through the machine.

28. In a can seaming machine, the combination of a carrier for the cans, a seaming device, means for moving said seaming device with a can to effect the seaming of the can and in a direction other than the direction of movement of said can to place the seaming device into operative relation to another can, and a fixed cam which causes the actuation of said seaming device to effect the seaming of the cans.

29. In a can seaming machine, the combination of a carrier for moving the cans continuously through the machine, a member movable with said carrier during a portion of the movement thereof and movable relatively to the carrier during another portion of the movement of said member, seaming devices on said member which effect the seaming of said cans while moving with said carrier, and a stationary cam which causes the seaming devices to move toward and from said cans.

30. In a container closing machine, the combination of a rotary carrier for the containers, a closing device, means for imparting an oscillatory movement to said closing device during a part of which movement said closing device moves on the arc of a circle with a container to effect the closing thereof and during another part of which movement said closing device moves into operative relation to another container, and a stationary cam engaged by said closing device and which moves said device into operative relation to a container.

In testimony whereof, I have hereunto set my hand and affixed my seal.

CHESLEY T. SMALL. [L. S.]